United States Patent
Beged-Dov et al.

(10) Patent No.: US 6,983,328 B2
(45) Date of Patent: Jan. 3, 2006

(54) TRUSTED INTERNET CLIPBOARD

(75) Inventors: Gabe Beged-Dov, Corvallis, OR (US); Stephen A Loughran, Corvallis, OR (US); Derek Roller, Corvallis, OR (US); James R. Miller, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 766 days.

(21) Appl. No.: 09/860,990

(22) Filed: May 18, 2001

(65) Prior Publication Data

US 2002/0174241 A1 Nov. 21, 2002

(51) Int. Cl.
*G06F 15/16* (2006.01)
(52) U.S. Cl. ............... 709/230; 709/202; 709/217; 709/224; 709/225; 707/513; 345/855
(58) Field of Classification Search ............... 709/230, 709/229, 202, 217, 224, 225; 707/513, 201; 345/855; 713/200
See application file for complete search history.

(56) References Cited

U.S. PATENT DOCUMENTS

| | | | |
|---|---|---|---|
| 5,964,834 A | 10/1999 | Crutcher | |
| 6,343,323 B1 * | 1/2002 | Kalpio et al. | 709/229 |
| 6,442,571 B1 * | 8/2002 | Haff et al. | 707/201 |
| 2001/0044810 A1 * | 11/2001 | Timmons | 707/513 |
| 2004/0100507 A1 * | 5/2004 | Hayner et al. | 345/855 |

FOREIGN PATENT DOCUMENTS

| | | |
|---|---|---|
| EP | 0 670 547 A2 | 9/1995 |
| JP | 2001-0035206 | 5/2001 |
| WO | WO 00/73902 A1 | 12/2000 |

OTHER PUBLICATIONS

Windows 2000 Simplifies Top 15 Administrative Tasks [Online] Available: http://www.microsoft.com/windows2000/library/howitworks/management/adminsave.asp [Jun. 9, 2000].

Microsoft Windows 2000, Internet Information Services Features [Online] Available: http://www.microsoft.com/WINDOWS2000/guide/server/features/web.asp [Jun. 9, 2000].

Microsoft Windows 2000, Internet Information Services 5.0 Technical Overview [Online] Available: http://www.microsoft.com/WINDOWS2000/library/howitworks/iis/iis5techoverview.asp [Jun. 9, 2000].

* cited by examiner

*Primary Examiner*—Ario Etienne
*Assistant Examiner*—Yves Dalencourt

(57) ABSTRACT

A system, method and computer-readable medium for using an Internet clipboard service to loosely couple web services by intercepting download and upload actions of a user in web interfaces to streamline information transfer from a source web service to a destination web service. The method includes the steps of: intercepting a user's request, capturing information retrieved for the request, editing the recorded messages, and replaying the messages on an Internet clipboard server to effect the resource transfer.

33 Claims, 8 Drawing Sheets

START PASTE TO DESTINATION SERVICE

Fig. 4A

STOP PASTE TO DESTINATION SERVICE

Fig. 4B

TRUSTED INTERNET CLIPBOARD

FIELD OF THE INVENTION

The present invention relates generally to levels of integration between Internet (also known as World Wide Web or web) services, and more particularly to streamlined movement of web resources from a source web service to a destination web service.

BACKGROUND OF THE INVENTION

With respect to desktop applications, the lowest level of integration that is possible is the passing of resources via a well-known storage location such as the file system. In a file system, a user may simply enter a path and access the desired file. A clipboard is a special file or memory area where data is stored temporarily before being copied to another location. Clipboards streamline application integration. Many desktop applications, e.g. word processors, use a clipboard for cutting and pasting. When a block of pre-selected text is cut, the word processor copies the block to the clipboard. When the block of pre-selected text on the clipboard is pasted, the block is copied to its final destination, which is often another application program.

Clipboards may support varying levels of meta-data about copied resources, such as descriptive attributes and resource format descriptions. Also, clipboards may support the transfer of resource meta-data that can facilitate negotiation between source and destination services. For example, a text block cut to the clipboard from a word processor may be accompanied by a meta-data tag indicating that the text has been spell-checked. A destination application to which the text block is pasted may evaluate the "spell-checked" tag and determine that it may skip its usual routine step of spell-checking incoming data.

Much like the levels of integration that are possible between desktop applications, there are varying levels of integration that are possible between web services. However, present web services do not provide for a direct channel for the transfer of resources between source and destination services. Presently, a resource must be first transferred (downloaded) from the source web service to an end-user's client computer and then transferred (uploaded) from the end-user's client computer to the destination web service. In the present topology of the Internet and World Wide Web, the transmission bandwidth available to end-user client computers is often limited, particularly when compared to the transmission bandwidth available to web server computers on which web service applications execute. Web server computers are most often located on the premises of Internet Service Providers (ISP) or Application Service Providers (ASP) that have high-bandwidth connections to the Internet. Thus, presently the transfer of a resource from a source web service to a destination web service is often inefficient due to the required intermediate transfers of the resource to and from an end-user client system. A further present limitation to web resource transfers is that the Internet/World Wide Web connection to an end-user's client computer is often not very secure, i.e. it is subject to both physical and electronic intrusion, particularly when compared to the security of the connection between web services, which as previously mentioned are most often hosted on the protected physical premises of an ISP or ASP and are also connected much closer to high-bandwidth, restricted, main Internet transmission channels. Thus, the secure transfer of resources from a source web service to a destination service may be compromised due to the need for the intermediate transfers to and from an end-user's client computer.

Consequently there is a need for a method and system to facilitate the efficient and secure transfer of resource(s) from a source web service to a destination web service.

SUMMARY OF THE INVENTION

The present invention provides a system, method and computer-readable medium for using an intermediary Trusted Internet Clipboard web service to loosely couple source and destination web services for the purpose of efficiently and securely transferring resource(s) from the source web service to the destination web service without requiring the resource(s) to be intermediately transferred to and from an end-user's client computer. The actions of the Trusted Internet Clipboard Service are remotely initiated and coordinated by a Local Clipboard Proxy executing on the end-user's client computer. By being an intermediary to the resource transfer, the Trusted Clipboard Service further allows for additional (optional) operations and transformations to be performed on the resource(s) before sending them to the destination service.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. Dash lines in the figures indicate optional steps or optional implementations.

FIGS. 4A–4B are example user interface dialogues for the Local Internet Clipboard Proxy Graphical User interface to facilitate an end-user to start and stop an Internet Clipboard resource "paste" transaction to a Destination Web Service.

DETAILED DESCRIPTION OF THE PREFERRED EMBODIMENT

Figure 1:
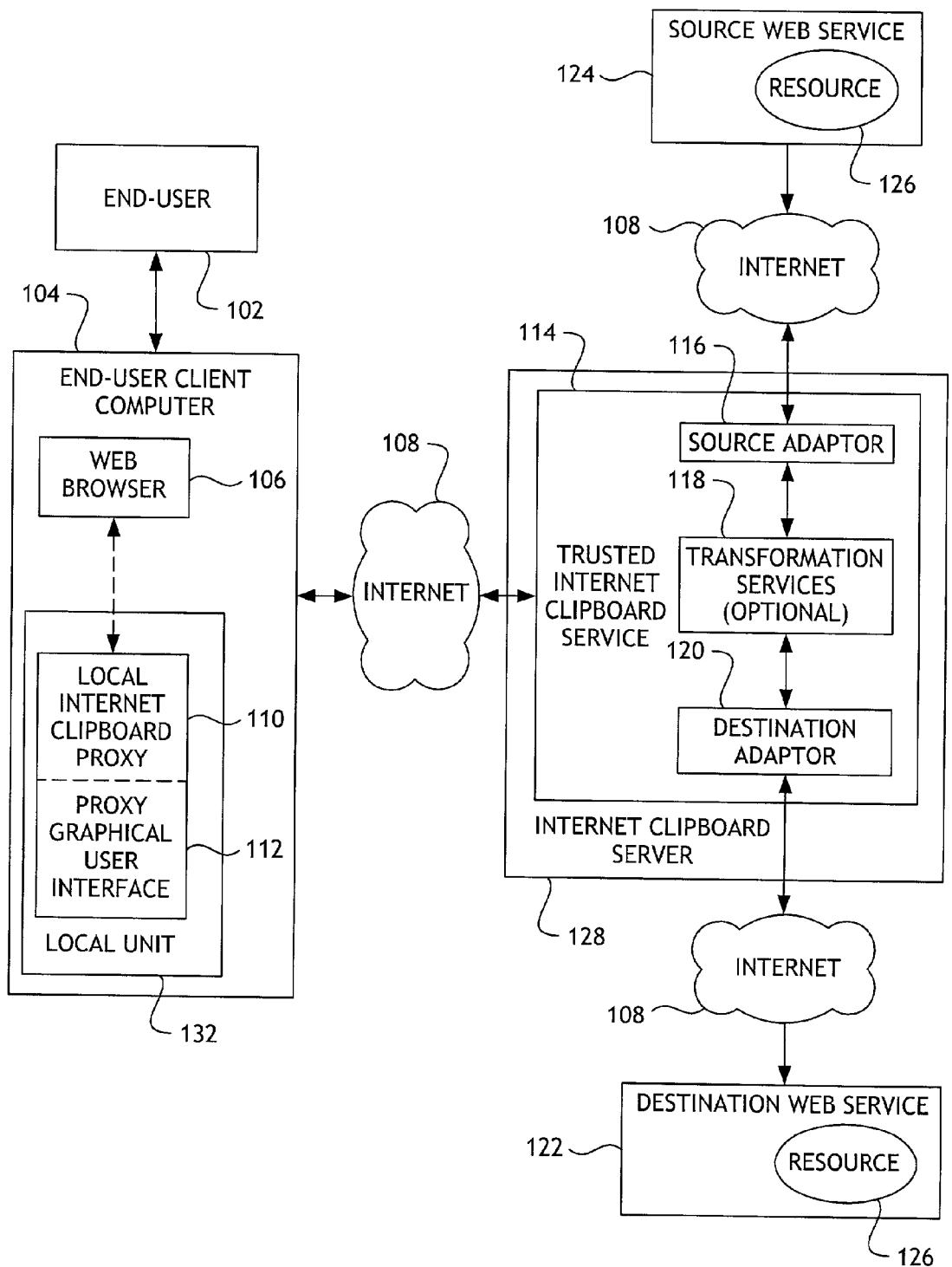
FIG. 1 is a schematic of one embodiment of the present invention.

The present invention provides an efficient and secure method and system for movement of web resource(s) from a Source Web Service to a Destination Web Service while concomitantly allowing optional transformation services to be applied to the resource(s) as part of the transfer. In reference to FIG. 1, the present invention loosely couples a Source Web Service (124) to a Destination Web Service (122) by utilizing an intermediary Trusted Internet Clipboard Service (114).

The Trusted Internet Clipboard Service consists of a Source Adaptor (116), a Destination Adaptor (120) and one or more optional Transformation Service (118) modules. The Source Adaptor (116) and Destination Adaptor (120) code modules are generally unique to the Source and Destination Services, respectively. The communication protocols, involving HTTP, i.e. HyperText Transfer Protocol requests and replies, will generally be proprietary to the Source and Destination Service applications, and their implementation requires internal working knowledge of these Services. This will generally require that the adaptors be implemented by the providers of those Web Services (or with access to specifications for those services). Standard protocols are now emerging in the industry, such as Web-DAV (a standard being developed within the Internet Engineering Task Force body facilitating Web-based Distributed Authoring and Versioning of resources). Such standards will enable consistent, uniform transfer of web service resources. It will be possible to implement general purpose, non-proprietary, Source and Destination Adaptors that comply with such standards and that will operate with any Web Services which also comply with such standards. Further discussion of these emerging standards is not material to, and beyond the scope of, this description of the present invention, which may utilize such standards to simplify and generalize the implementation of Source and Destination Adaptor modules.

The present invention furthermore utilizes a Local Internet Clipboard Proxy program (110) executing on an End-User Client Computer (104) system to remotely control the actions of the Trusted Internet Clipboard Service (114). The End-User (102) interacts with the Local Internet Clipboard Proxy (110) by accessing the Proxy Graphical User Interface (112). Though not illustrated, the Trusted Internet Clipboard Service (114), like the Source and Destination Web Services (124, 122) is hosted, and executes, on a server of a known and trusted ISP or ASP. As previously mentioned, ISP's and ASP's generally have secure physical premises and high-bandwidth secure connections to the Internet (108). The End-User Client Computer system (104) may be in any remote location having a connection to the Internet (108). An End-User (102) interacts over the Internet with all Web Services (124, 122) by utilizing a Web Browser application (106), such as Microsoft Internet Explorer, executing on the Client Computer (104). The Web Browser is configured such that all web interactions (utilizing HTTP, Hypertext Transfer Protocol) are routed through the Local Internet Clipboard Proxy (110). The local Internet Clipboard Proxy 110 and the proxy graphical user interface 112 are elements of the local unit 132, which couples the end-user client computer 104 to the Internet 108. As will be further explained, by routing all web interactions through the Local Internet Clipboard Proxy (110), the Proxy is able to monitor and record such interactions for purposes of controlling the Trusted Internet Clipboard Service (114), located on the Internet clipboard server 128, to effect resource (126) transfer from the Source (124) to Destination (122) Web Service. The Local Internet Clipboard Proxy (110) communicates with the Trusted Internet Clipboard Service (114) over the Internet (108) via the Internet clipboard service (114) using HyperText Transfer Protocol (HTTP) messages and is thus able to effect remote control of the Trusted Internet Clipboard Service (114) from the End-User Client Computer (104).

Figure 2A:
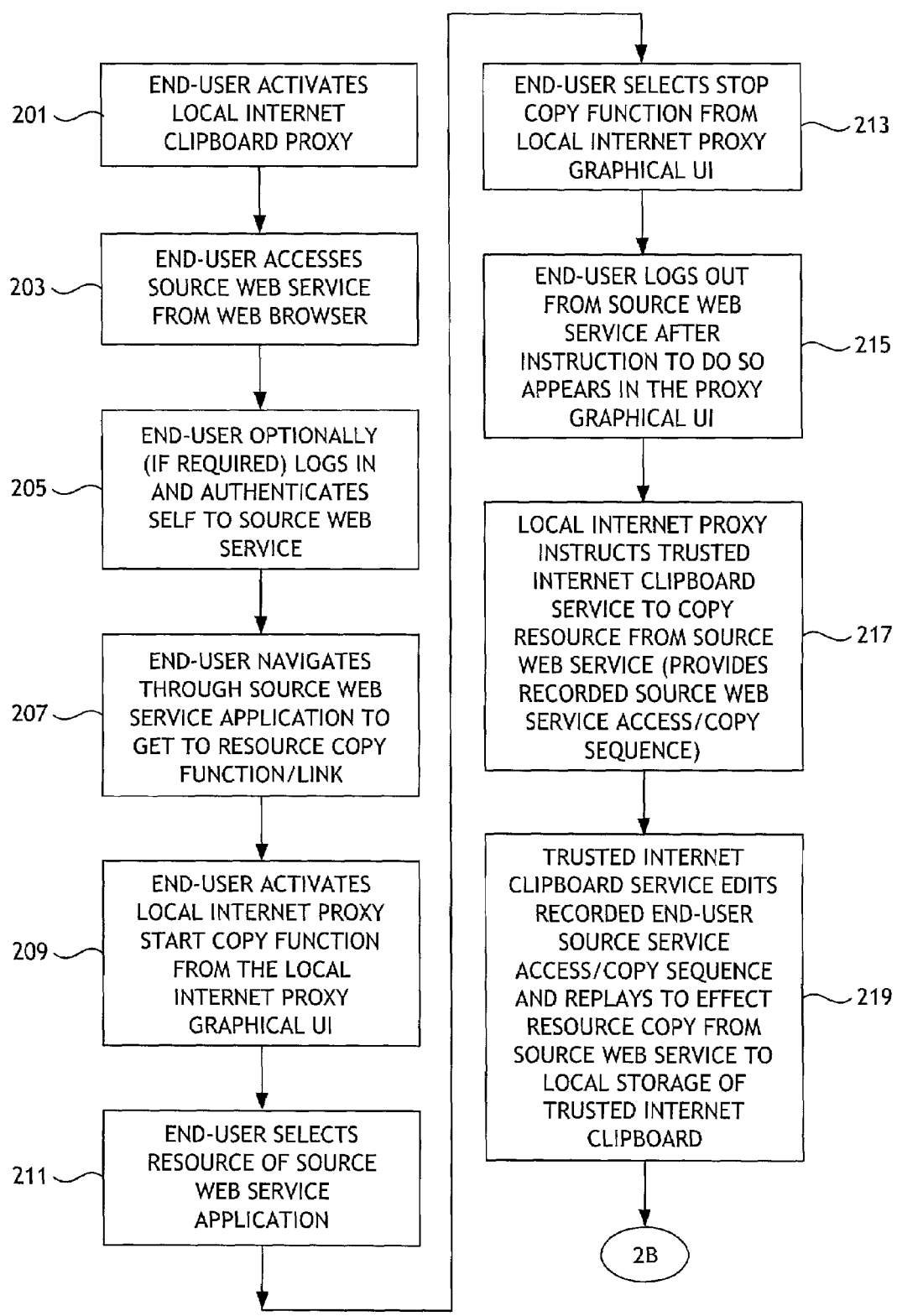
FIGS. 2A–2B are flow charts showing steps for one embodiment of a Trusted Internet Clipboard method and computer-executable steps for a computer-readable medium for loosely coupling web services to streamline secure resource transfer from a source web service to a destination web service in accordance with the present invention.
Figure 2B:
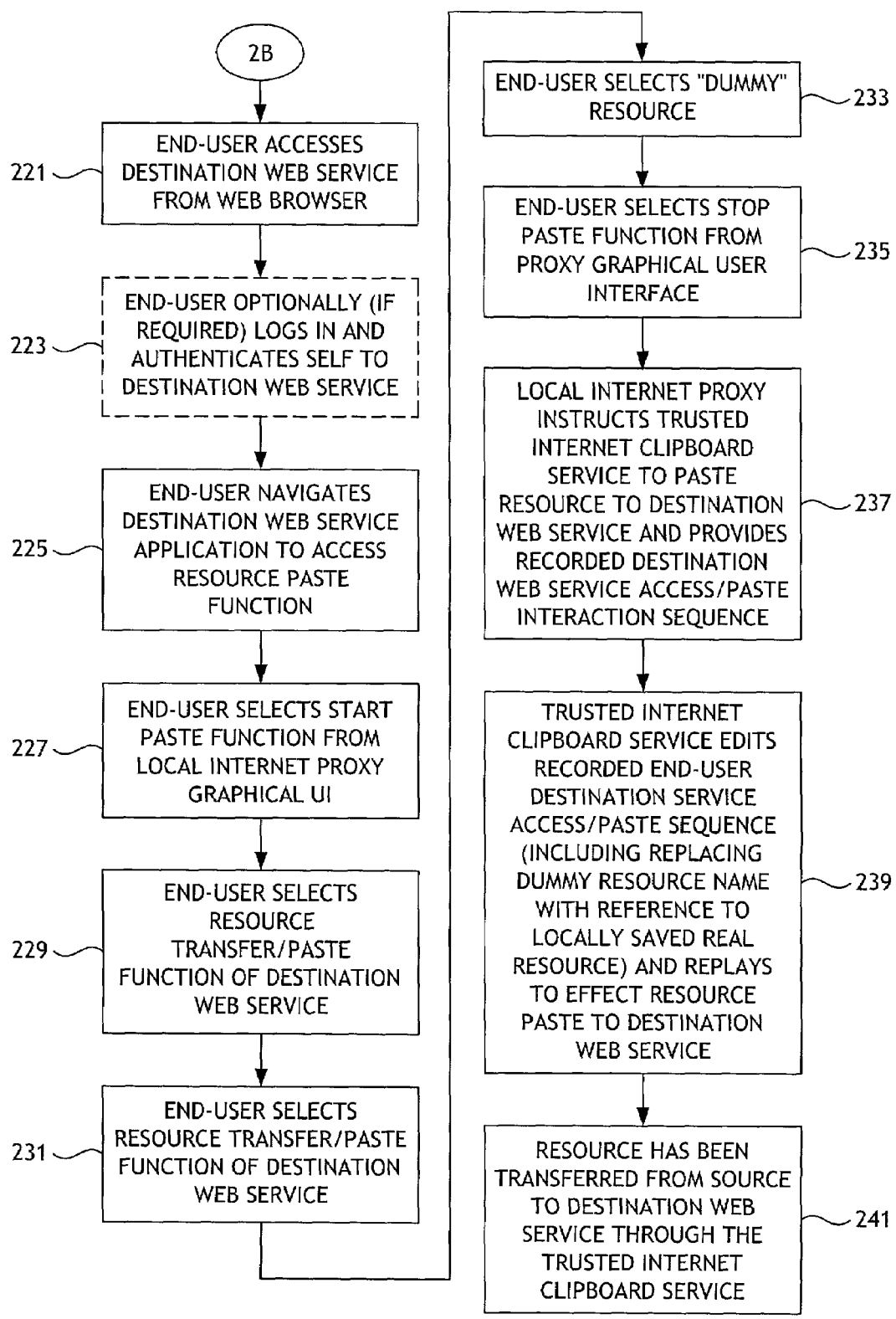
Figure 3A:
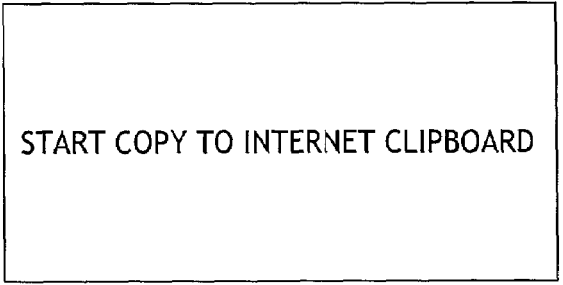
FIGS. 3A–3C are example user interface dialogues for the Local Internet Clipboard Proxy Graphical User Interface to facilitate an end-user to start and stop an Internet Clipboard resource "copy transaction" from a Source Web Service.
Figure 3B:
Figure 3C:
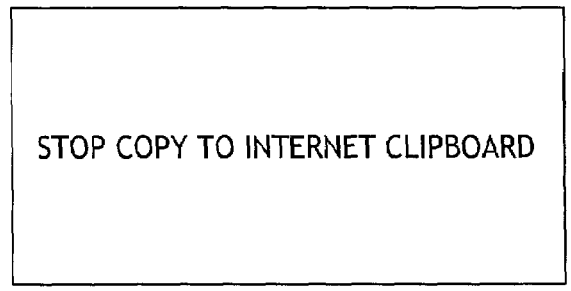

The operation of the aforementioned components of the present invention will be explained in conjunction with further reference to FIG. 1, to the flowchart of FIGS. 2A and 2B, which illustrates the method of the invention to effect the transfer of a Source Web Service Resource (126) to a Destination Web Service (122), and to the examples of Local Internet Clipboard Proxy user interface screens shown in FIGS. 3A, 3B, 3C, 4A and 4B. In this example, an End-User (102) desires to transfer a Resource (126), e.g. an image file, from a Source Web Service (124) to a Destination Web Service (122). In step 201, the End-User (102) starts or otherwise activates the Local Internet Clipboard Proxy (110). This causes the Proxy Graphical User Interface (112) to be displayed on a portion of the End-User's display and causes the Local Internet Clipboard Proxy (110) to establish an Internet connection/session with the Trusted Internet Clipboard Service (114). In step 203, the End-User (102) accesses the Source Web Service (124) by entering the Service's Uniform Resource Locator (URL) into the Web Browser (106). The Source Web Service (124) will present web pages to the End-User (102) via the Web Browser (106). In step 205, the End-User (102) optionally (if required to do so) logs in and authenticates himself to the Source Web Service (124) to establish a user session, e.g. by entering a unique identifier and password. During step 205, the Local Internet Clipboard Proxy (110) records the End-User interactions (including log in and authentication information) used to establish the session with the Source Web Service (124). In step 207 the End-User (102) interacts with the Source Web Service (124) to navigate to the web page displaying the resource transfer/copy function. In step 209, the End-User (102) initiates a Trusted Internet Clipboard resource transfer by selecting the Start Copy interface dialogue of the Proxy Graphical User Interface (112) as illustrated in FIG. 3A. Once this occurs, the Local Internet Clipboard Proxy (110) subsequently records all web interactions of the End-User (102) with the Source Web Service (124), until the Proxy Stop Copy function is selected. In step 211, the End-User (102) next interacts with the Source Web Service (124) to copy the desired Resource (126) as if the resource were being copied/downloaded to the End-User Client Computer (104). It is important to note that the Resource (126) is not actually copied during step 211, and in particular, it will not be copied to the End-User Client Computer (104). Instead, the End-User interactions (as embodied in the HTTP messages between the End-User's Web Browser (106) and the Source Web Service (124)) necessary to copy the resource are intercepted and recorded by the Local Internet Proxy (110), and the final HTTP message to the Source Web Service (124) that would effect the transfer is intercepted/blocked by the Local Internet Clipboard Proxy (110) and not forwarded to the Source Web Service (124). In step 213, the End-User (102) selects the Stop Copy function of the Local Internet Clipboard Proxy (110) by interacting with the Stop Copy user interface dialogue as illustrated in FIG. 3B. In step 215 the End-User (102) complies with instructions to log off from the Source Web Service (124) presented by a Local Proxy dialogue as illustrated in FIG. 3C. In step 217 the Local Internet Clipboard Proxy (110) commands (via an HTTP message sent over the Internet) the Trusted Interface Clipboard Service (114) to copy/transfer the resource from the Source Web Service (124) to a temporary storage area maintained by the Clipboard Service. Also transmitted within an HTTP message to the Trusted Internet Clipboard Service (114) at this time is the web interaction sequence recorded by the Local Internet Clipboard Proxy (110) during steps 207-211. In step 219, the Trusted Internet Clipboard Service (114) edits this recorded web interaction sequence to change the copy destination to its own local temporary storage area instead of the End-User Client Computer (104) and then replays the web interaction sequence to establish an End-User session with the Source Web Service (124) and to cause the desired Resource (126) to be copied to the Trusted Internet Clipboard Service's temporary local storage area.

In steps 221–223 the End-User (102) logs in and authenticates himself to the Destination Web Service (122). In step 225 the End-User (102) navigates through the user interface of the Destination Web Service (122) to reach the web page in that application/service to request that a resource be transferred. In step 227 the End-User (102) selects Start Paste function of the Local Internet Clipboard Proxy (110) by interacting with the Start Paste user interface dialogue as illustrated in FIG. 4A. In step 229 the End-User (102) selects the resource transfer/paste function of the Destination Web Service (122). In step 231 the Web Browser (104) displays a dialogue (not illustrated) to the End-User (102), allowing the End-User (102) to specify (or browse to) the desired resource to transfer. In step 233 the End-User (102) specifies a "dummy" resource to the Destination Web Service (122). This dummy resource will not actually be the resource transferred and may thus be any resource accessible to the End-User (102) and recognizable by the local proxy (110) as a dummy resource from the Destination Web Service transfer dialogue. In step 235 the End-User (102) selects the Stop Paste function from the Proxy Graphical User Interface as illustrated in FIG. 4B. In step 237 the Local Internet Clipboard Proxy (110) instructs the Trusted Internet Clipboard Service (114) to transfer/paste the resource being saved in its temporary storage area to the Destination Web Service (122). In step 239 the Trusted Internet Clipboard Service (114) edits the recorded transfer request and substitutes the Uniform Resource Identifier (URI) for the copy of the real resource to be transferred being saved in its temporary storage area for the dummy resource specified in the recorded HTTP message sequence. In Step 241 the transfer of Resource (126) from Source Web Service (124) to Destination Web Service (122) has been completed. Note that the Trusted Internet Clipboard Service (114) may perform optional Transformation Services (118) on the Resource (126) being transferred prior to sending the resource to the Destination Web Service (122). Such transformations, e.g. file format conversions, may be necessary or useful to further facilitate integration of the Source and Destination Web Services.

Figure 5:
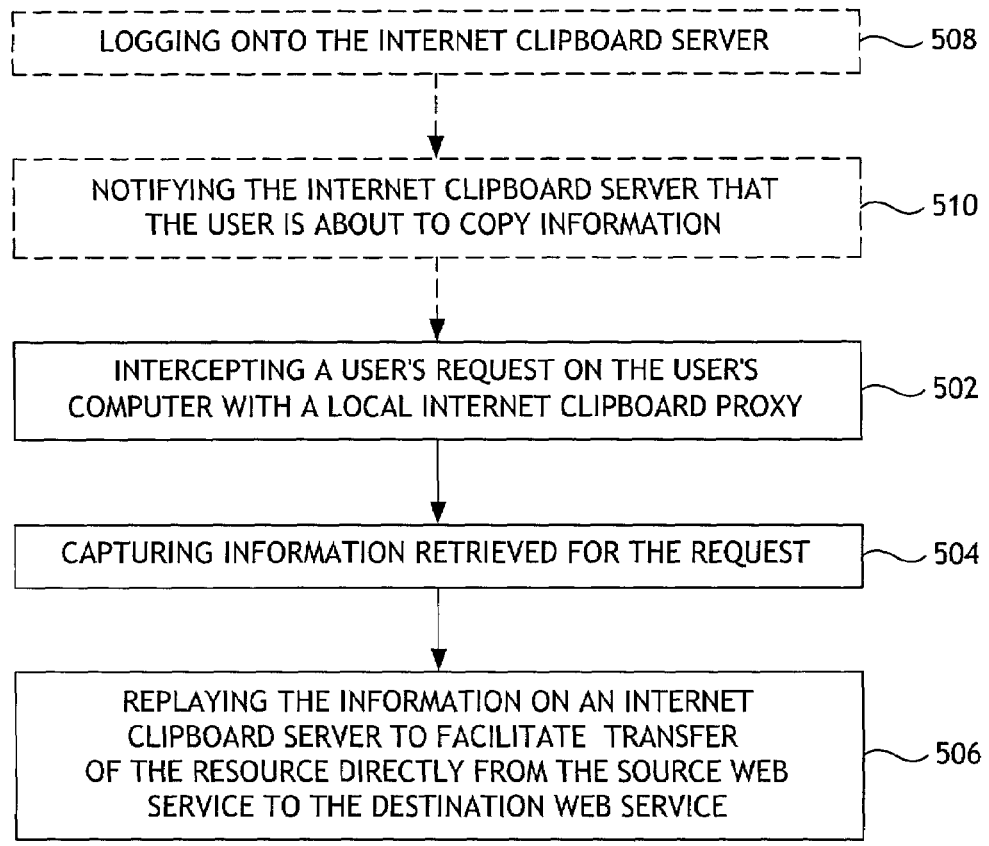
FIG. 5 is a flow diagram showing one embodiment of steps for implementing the method of the present invention, which may, if desired, be implemented in a computer-readable medium with computer-executable instructions.

Thus, as shown in FIG. 5, the present invention provides an Internet clipboard method for loosely coupling web services by intercepting resource download and upload actions for a user in web interfaces to streamline information transfer from a source web service to a destination web service. The steps typically include: intercepting 502 a user's request on the user's computer with a local Internet clipboard proxy; capturing 504 information retrieved for the request; and replaying 506 the information on an Internet clipboard server to facilitate transfer of the resource directly from the source web service to the destination web service.

Clearly, a computer-readable medium with computer-executable instructions may be utilized for implementing the steps. Where desired, the steps of the method may be implemented in a computer-readable medium 500 with computer-executable instructions 501 for carrying out the steps.

Prior to intercepting the user's request, the user may log onto 508 the Internet clipboard server and may notify 510 the Internet clipboard server that the user is about to copy information. Capturing information retrieved for the request may include, upon intercepting the user's request, sending, by the Internet clipboard server, the request to the source web service via a source adapter. Capturing information retrieved for the request may also include retrieving, by the source web service, information for the request and sending the information to the source adapter in a response. Also, capturing information retrieved for the request may include parsing, by the source adaptor, the information, extracting content from the information to storage, and sending the response to a web browser of the user. In addition, capturing information retrieved for the request may include notifying the proxy graphic user interface of the local unit that the user is about to paste, and/or may include placing, by the local unit, a dummy file in a staging folder.

Where desired, capturing information retrieved for the request may include using a web browser's file upload on a proxy graphic user interface to upload the dummy file and/or may include submitting, by the web browser, a multi-part form with data request file to the Destination Web Service (122). Capturing information retrieved for the request may also include intercepting, by the local unit, the request and sending the request to an Internet clipboard service and/or may include replacing, by the Internet clipboard service, the dummy file with actual content and sending the content to the destination web service.

As shown in FIG. 1, in one embodiment the present invention provides an Internet clipboard server system for loosely coupling web services by intercepting download and upload actions for a user in web interfaces to streamline information transfer from a source web service to a destination web service, wherein the system may include a web browser 106, a local unit 132, a source web service 124, a destination web service 122 and an Internet clipboard server 128. The web browser 106 is arranged to communicate with the source web service 124 and the destination web service 122 via a local Internet clipboard proxy 110 and to the Internet clipboard server 128 via local Internet clipboard proxy-Internet clipboard service communication. The web browser 106 is used for placing a request, by a user, to access and download Internet information. The local unit 132 is arranged to communicate with the source web service 124, the destination web service 122, and the web browser 106 via the local Internet clipboard proxy 110 and to the Internet clipboard server 128 via local Internet clipboard proxy-Internet clipboard service communication. The local unit 132 is used for, in coordination with the Internet clipboard server 128, intercepting and facilitating download and upload actions for the user in web interfaces to streamline information transfer from—the source web service 124 to the destination web service 122.

The source web service 124 is coupled to the Internet 108 and the web browser 106 via the local Internet clipboard proxy 110 and to the Internet clipboard server 128 via a source adaptor 116, and provides Internet information requested by the user. The destination web service 122 is coupled to the web browser 106 via the local Internet clipboard proxy 110 and to the Internet clipboard server 128 via a destination adapter 120. The destination web service 122 receives Internet information requested by the user. The Internet clipboard server 128 is coupled to the source web service 124 and the destination web service 122 and to the local unit 132 via the local Internet clipboard proxy-Internet clipboard service communication, for, in coordination with the Internet clipboard server 128. The Internet clipboard server facilitates intercepting download and upload actions for the user in web interfaces to streamline information transfer from the source web service to the destination web service.

Where desired, prior to the local unit's intercepting the user's request, the user may log onto the Internet clipboard server, and if desired, may also notify the Internet clipboard server 128 that the user is about to copy information. Upon intercepting the user's request, the Internet clipboard server 128 may send the request to the web source 106 via a source adapter 116, retrieve the information for the request and send the information to the source adapter 116 in a response.

Generally, the source adaptor 116 parses the information, extracts content from the information to storage, and sends the response to a web browser 106 of the user. The Internet clipboard server 128 typically adds origin metadata to the content to provide enhanced content and places the enhanced content in a proxy graphic user interface 112 of the local unit 132. The user then generally notifies the proxy graphic user interface 112 of the local unit 132 that the user is about to paste, the local unit 132 places a dummy file in a staging folder, and the user implements a web browser's file upload on a proxy graphic user interface 112 to upload the dummy file. Then, the web browser 106 submits a multipart form with data request file to the source web service 124, the local unit 132 intercepts a user's request and sends the request to the Internet clipboard service 130, and the Internet clipboard service (114) replaces the dummy file with actual content and sends the content to the destination web service 122.

Figure 6:
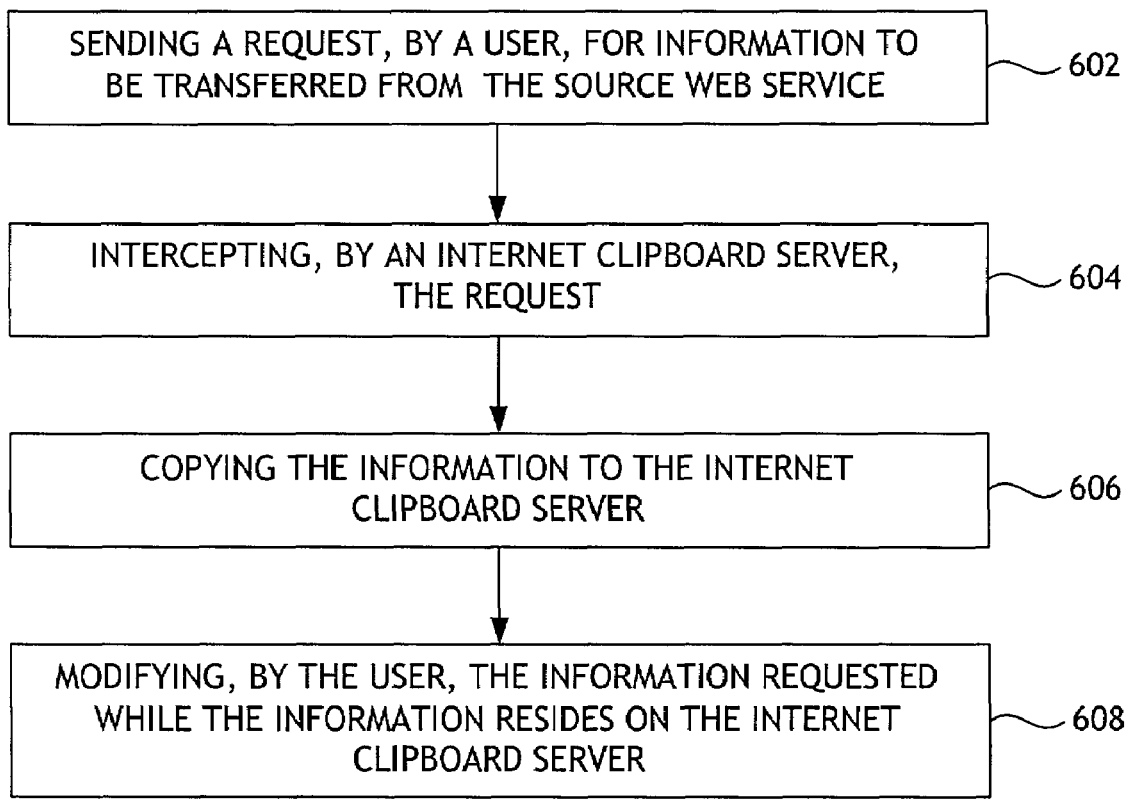
FIG. 6 is a flow diagram showing another embodiment of steps for implementing the method of the present invention, which may, if desired, be implemented in a computer-readable medium with computer-executable instructions.

As shown in FIG. 6, in another embodiment of the method of the present invention wherein a mediated download and upload web service is provided that streamlines information transfer from a source web service to a destination web service, the following steps are implemented: sending 602 a request, by a user, for information to be transferred from the source web service; intercepting 604, by an Internet clipboard server, the request; copying 606 the information to the Internet clipboard server; and modifying 608, by the user, the information requested while the information resides on the Internet clipboard server. Where desired, the steps of the method may be implemented in a computer-readable medium 600 with computer-executable instructions 601 for carrying out the steps.

Where desired, the information may be a photograph. The information may include a video sequence that is replayed on the Internet clipboard server 128 and modified by the user. Alternatively, the information may include an audio sequence that is replayed on the Internet clipboard server 128 and modified by the user. In addition, the information may include a video and audio sequence that is replayed on the Internet clipboard server and modified by the user.

Figure 7:
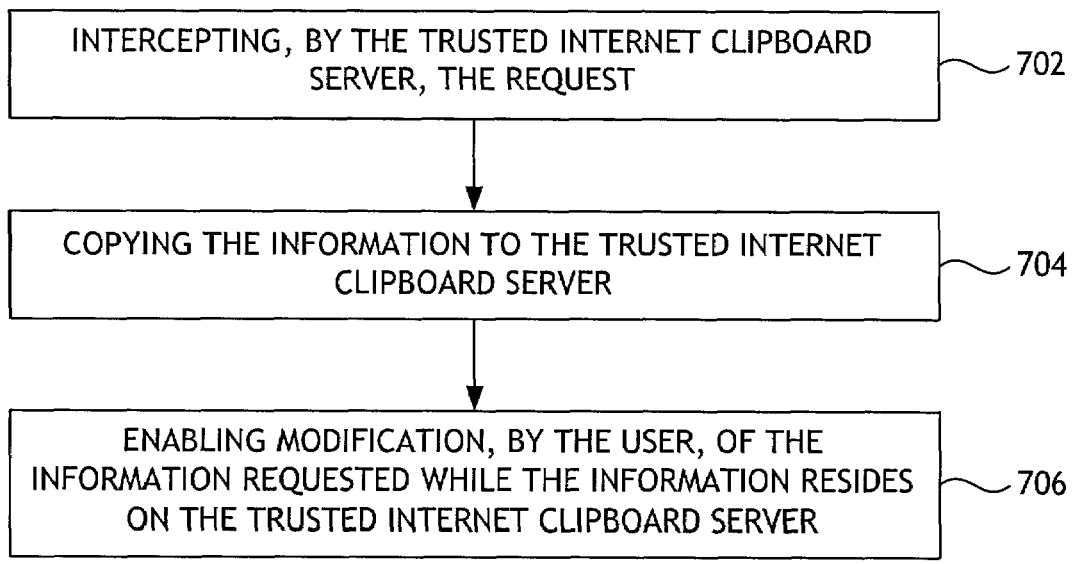
FIG. 7 is a flow diagram showing another embodiment of steps for implementing the method of the present invention, which may, if desired, be implemented in a computer-readable medium with computer-executable instructions.

FIG. 7 is a flow diagram showing another embodiment of steps for implementing the method of the present invention for a trusted Internet clipboard server for providing a mediated download and upload web service that streamlines information transfer from a source web service to a destination web service, where the steps may, if desired, be implemented in a computer-readable medium 700 with computer-executable instructions 701.

In this embodiment, the steps utilized include, upon a user's sending a request for information to be transferred from the source web service, intercepting 702, by the trusted Internet clipboard server, the request; copying 704 the information to the trusted Internet clipboard server; and enabling 706 modification, by the user, of the information requested while the information resides on the trusted Internet clipboard server. Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. An Internet clipboard method for loosely coupling web services by intercepting resource download and upload actions for a user in web interfaces to streamline information transfer from a source web service to a destination web service, comprising the steps of:
   intercepting a user's request on the user's computer with a local Internet clipboard proxy;
   specifying, by the user, a dummy resource to the destination web service, wherein the dummy resource is not actually a resource transferred and is configured to be any resource accessible by the user and recognizable by the local Internet clipboard proxy as not actually a resource from transfer dialogue of the destination web service;
   capturing information retrieved for the request; and
   re-playing the information on an Internet clipboard server to facilitate trusted and secure transfer of the resource directly from the source web service to the destination web service without having the resource to be intermediately transferred to and from a client computer of the user.

2. The method of claim 1 including, prior to intercepting the user's request, logging onto the Internet clipboard server by the user.

3. The method of claim 2 including, after logging onto the Internet clipboard server, notifying the Internet clipboard server that the user is about to copy information.

4. The method of claim 3 wherein capturing information retrieved for the request includes, upon intercepting the user's request, sending, by the Internet clipboard server, the request to the source web service via a source adapter.

5. The method of claim 4 wherein capturing information retrieved for the request further includes retrieving, by the source web service, information for the request and sending the information to the source adapter in a response.

6. The method of claim 5 wherein capturing information retrieved for the request further includes parsing, by the source adaptor, the information, extracting content from the information to storage, and sending the response to a web browser of the user.

7. The method of claim 6 wherein capturing information retrieved for the request further includes adding, by the Internet clipboard server, origin metadata to the content to provide enhanced content and placing the enhanced content in a proxy graphic user interface of a local unit.

8. The method of claim 7 wherein capturing information retrieved for the request further includes notifying the proxy graphic user interface of the local unit that the user is about to paste.

9. The method of claim 8 wherein capturing information retrieved for the request further includes placing, by the local unit, a dummy file in a staging folder.

10. The method of claim 9 wherein capturing information retrieved for the request further includes using a web browsers file upload on a proxy graphic user interface to upload the dummy file.

11. The method of claim 10 wherein capturing information retrieved for the request further includes submitting, by the web browser, a multipart form with data request file to the source web service.

12. The method of claim 11 wherein capturing information retrieved for the request further includes intercepting, by the local unit, the request and sending the request to an Internet clipboard service.

13. The method of claim 12 wherein capturing information retrieved for the request further includes replacing, by the Internet clipboard service, the dummy file with actual content and sending the content to the destination web service.

14. A computer-readable medium with computer-executable instructions for implementing the steps of claim 1.

15. An Internet clipboard server system for loosely coupling web services by intercepting download and upload actions for a user in web interfaces to streamline information transfer from a source web service to a destination web service, comprising:
    a web browser, coupled to the source web service and the destination web service via a local Internet clipboard proxy and to an Internet clipboard server via a local Internet clipboard proxy-Internet clipboard service communication, for placing a request, by a user, to access and download Internet information;
    the local unit, coupled to the source web service, the destination web service, and the web browser via the local Internet clipboard proxy and to the Internet clipboard server via a local Internet clipboard proxy-Internet clipboard service communication, for, in coordination with the Internet clipboard server, intercepting and facilitating download and upload actions for the user in web interfaces to streamline information trusted and secure transfer from—the source web service to the destination web service without having the information to be intermediately transferred to and from a client computer of the user;
    the source web service, coupled to the Internet and the web browser via the local Internet clipboard proxy and to the Internet clipboard server via a source adaptor, for providing Internet information requested by the user;
    the destination web service, coupled to the web browser via the local Internet clipboard proxy and to the Internet clipboard server via a destination adapter, for receiving Internet information requested by the user;
    the Internet clipboard server, coupled to the source web service and the destination web service and to the local unit via the local Internet clipboard proxy-Internet clipboard service communication, for, in coordination with the Internet clipboard server, facilitating intercepting download and upload actions for the user in web interfaces to streamline information trusted and secure transfer from the source web service to the destination web service without having the information to be intermediately transferred to and from the client computer of the user; and
    a dummy resource specified by the user to the destination web service, wherein the dummy resource is not actually a resource transferred and is configured to be any resource accessible by the user and recognizable by the local Internet clipboard proxy as not actually a resource from transfer dialogue of the destination web service.

16. The system of claim 15 wherein, prior to the local unit's intercepting the user's request, the user logs onto the Internet clipboard server.

17. The system of claim 16 including, after logging onto the Internet clipboard server, the user notifies the Internet clipboard server that the user is about to copy information.

18. The system of claim 17 wherein, upon intercepting the user's request, the Internet clipboard server sends the request to the web source via a source adapter.

19. The system of claim 18 wherein, upon the web source receiving the request, the source web service retrieves information for the request and sends the information to the source adapter in a response.

20. The system of claim 19 wherein the source adaptor parses the information, extracts content from the information to storage, and sends the response to a web browser of the user.

21. The system of claim 20 wherein the Internet clipboard server adds origin metadata to the content to provide enhanced content and places the enhanced content in a proxy graphic user interface of the local unit.

22. The system of claim 21 wherein the user notifies the proxy graphic user interface of the local unit that the user is about to paste.

23. The system of claim 22 wherein the local unit places a dummy file in a staging folder.

24. The system of claim 23 wherein the user implements a web browser's file upload on a proxy graphic user interface to upload the dummy file.

25. The system of claim 24 wherein the web browser submits a multipart form with data request file to the source web service.

26. The system of claim 25 wherein the local unit intercepts a user's request and sends the request to the Internet clipboard service.

27. The system of claim 26 wherein the Internet clipboard service replaces the dummy file with actual content and sends the content to the destination web service.

28. A method for providing a mediated download and upload web service that streamlines information transfer from a source web service to a destination web service, comprising the steps of:
    sending a request, by a user, for information to be transferred securely from the source web service;
    intercepting, by an Internet clipboard server, the request;
    specifying, by the user, a dummy resource to the destination web service, wherein the dummy resource is not actually a resource transferred and is configured to be any resource accessible by the user and recognizable by the local Internet clipboard proxy as not actually a resource from transfer dialogue of the destination web service;
    copying the information to the Internet clipboard server; and
    modifying, by the user, the information requested while the information resides on the Internet clipboard server to enable trusted and secure transfer without having the information to be intermediately transferred to and from a client computer of the user.

29. The method of claim 28 wherein the information is a photograph.

30. The method of claim 28 wherein the information includes a video sequence that is replayed on the Internet clipboard server and modified by the user.

31. The method of claim 28 wherein the information includes an audio sequence that is replayed on the Internet clipboard server and modified by the user.

32. The method of claim 28 wherein the information includes a video and audio sequence that is replayed on the Internet clipboard server and modified by the user.

33. A computer-readable medium having computer-executable instructions for a trusted Internet clipboard server for providing a mediated download and upload web service that streamlines information transfer from a source web service to a destination web service, wherein the computer-executable instructions comprise the steps of:

upon a user's sending a request for information to be transferred from the source web service;

intercepting, by the trusted Internet clipboard server, the request;

specifying, by the user, a dummy resource to the destination web service, wherein the dummy resource is not actually a resource transferred and is configured to be any resource accessible by the user and recognizable by the local Internet clipboard proxy as not actually a resource from transfer dialogue of the destination web service;

copying and securely transferring the information to the trusted Internet clipboard server; and enabling modification, by the user, of the information requested while the information resides on the trusted Internet clipboard server to enable trusted and secure transfer without having the information to be intermediately transferred to and from a client computer of the user.

* * * * *

UNITED STATES PATENT AND TRADEMARK OFFICE
CERTIFICATE OF CORRECTION

PATENT NO. : 6,983,328 B2  Page 1 of 1
APPLICATION NO. : 09/860990
DATED : January 3, 2006
INVENTOR(S) : Beged-Dov et al.

It is certified that error appears in the above-identified patent and that said Letters Patent is hereby corrected as shown below:

Col. 9 (line 3), delete "ers" and insert therefor --er's--.

Signed and Sealed this

Eighth Day of August, 2006

JON W. DUDAS
*Director of the United States Patent and Trademark Office*